United States Patent
Uebbing et al.

(10) Patent No.: US 10,429,034 B2
(45) Date of Patent: *Oct. 1, 2019

(54) LIGHT-EMITTING DEVICE WITH LIGHT GUIDE FOR TWO WAY ILLUMINATION

(71) Applicant: Quarkstar LLC, Las Vegas, NV (US)

(72) Inventors: John J. Uebbing, Palo Alto, CA (US); Roland H. Haitz, Portola Valley, CA (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,241

(22) Filed: Aug. 31, 2017

(65) Prior Publication Data

US 2018/0209610 A1 Jul. 26, 2018

Related U.S. Application Data

(63) Continuation of application No. 14/170,222, filed on Jan. 31, 2014, now Pat. No. 9,752,757.
(Continued)

(51) Int. Cl.
*F21V 29/00* (2015.01)
*F21V 13/04* (2006.01)
(Continued)

(52) U.S. Cl.
CPC ............... *F21V 13/04* (2013.01); *F21K 9/64* (2016.08); *F21K 9/66* (2016.08); *F21V 3/04* (2013.01);
(Continued)

(58) Field of Classification Search
CPC ..... F21V 13/04; F21K 9/64; F21K 9/66; G02B 5/045
See application file for complete search history.

(56) References Cited

U.S. PATENT DOCUMENTS 3,960,579 A 6/1976 Broerner
4,038,448 A 7/1977 Boyd et al.
(Continued)

FOREIGN PATENT DOCUMENTS

CN 101099245 1/2008
CN 101101910 1/2008
(Continued)

OTHER PUBLICATIONS

Allen, et al. "A nearly ideal phosphor-converted white light-emitting diode", Applied Physics Letters, vol. 92 (2008) 3 pages.
(Continued)

*Primary Examiner* — Ali Alavi
(74) *Attorney, Agent, or Firm* — Fish & Richardson P.C.

(57) ABSTRACT

A variety of light-emitting devices are disclosed that are configured to manipulate light provided by one or more light-emitting elements (LEEs). In general, a light-emitting device includes one or more light-emitting elements (LEEs) disposed on a base surface that are configured to emit light, a first optical element having a first surface spaced apart from the LEEs and positioned to receive light from the LEEs, a transparent second optical coupled to the first optical element, and a reflector element adjacent the second optical element arranged to reflect a portion of light output from the second optical element.

9 Claims, 6 Drawing Sheets

Related U.S. Application Data (60) Provisional application No. 61/774,391, filed on Mar. 7, 2013.

(51) Int. Cl.
| | | |
|---|---|---|
| *G02B 19/00* | (2006.01) | |
| *F21K 9/66* | (2016.01) | |
| *F21K 9/64* | (2016.01) | |
| *F21V 3/04* | (2018.01) | |
| *F21Y 115/10* | (2016.01) | |

(52) U.S. Cl.
CPC ..... *G02B 19/0028* (2013.01); *G02B 19/0061* (2013.01); *F21Y 2115/10* (2016.08)

(56) References Cited

U.S. PATENT DOCUMENTS

| | | |
|---|---|---|
| 4,240,692 A | 12/1980 | Winston |
| 4,301,461 A | 11/1981 | Asano |
| 4,374,749 A | 2/1983 | Cusano et al. |
| 4,389,118 A | 6/1983 | Yuasa et al. |
| 4,797,609 A | 1/1989 | Yang |
| 4,907,044 A | 3/1990 | Schellhorn et al. |
| 5,001,609 A | 3/1991 | Gardner et al. |
| 5,055,892 A | 10/1991 | Gardner et al. |
| 5,268,635 A | 12/1993 | Bortolini et al. |
| 5,282,088 A | 1/1994 | Davidson |
| 5,335,152 A | 8/1994 | Winston |
| 5,424,855 A | 6/1995 | Nakamura et al. |
| 5,727,108 A | 3/1998 | Hed |
| 5,856,727 A | 1/1999 | Schroeder et al. |
| 6,095,655 A | 8/2000 | Bigliati et al. |
| 6,111,367 A | 8/2000 | Asano et al. |
| 6,155,699 A | 12/2000 | Miller et al. |
| 6,236,331 B1 | 5/2001 | Dussureault |
| 6,479,942 B2 | 11/2002 | Kimura |
| 6,495,964 B1 | 12/2002 | Muthu et al. |
| 6,527,411 B1 | 3/2003 | Sayers |
| 6,617,560 B2 | 9/2003 | Forke |
| 6,642,618 B2 | 11/2003 | Yagi et al. |
| 6,819,505 B1 | 11/2004 | Cassarly et al. |
| 7,015,514 B2 | 3/2006 | Baur et al. |
| 7,091,653 B2 | 8/2006 | Ouderkirk et al. |
| 7,151,283 B2 | 12/2006 | Reeh et al. |
| 7,286,296 B2 | 10/2007 | Chaves et al. |
| 7,306,960 B2 | 12/2007 | Bogner et al. |
| 7,329,907 B2 | 2/2008 | Pang |
| 7,329,998 B2 | 2/2008 | Jungwirth |
| 7,344,902 B2 | 3/2008 | Basin et al. |
| 7,355,284 B2 | 4/2008 | Negley |
| 7,465,083 B2 | 12/2008 | Ohkawa |
| 7,490,971 B2 | 2/2009 | Iwasaki |
| 7,514,867 B2 | 4/2009 | Yano et al. |
| 7,522,802 B2 | 4/2009 | Shiau et al. |
| 7,828,453 B2 | 11/2010 | Tran et al. |
| 7,859,190 B2 | 12/2010 | Shi |
| 7,889,421 B2 | 2/2011 | Narendran et al. |
| 8,007,118 B2 | 8/2011 | O'Neill et al. |
| 8,083,364 B2 | 12/2011 | Allen |
| 8,168,998 B2 | 5/2012 | David et al. |
| 8,314,537 B2 | 11/2012 | Gielen et al. |
| 8,362,695 B2 | 1/2013 | Aanegola et al. |
| 8,436,380 B2 | 5/2013 | Aanegola et al. |
| 8,894,263 B2 | 11/2014 | Yeom |
| 9,752,757 B2 * | 9/2017 | Uebbing ............. F21V 13/04 |
| 2003/0117087 A1 | 6/2003 | Barth et al. |
| 2003/0235050 A1 | 12/2003 | West et al. |
| 2004/0013856 A1 | 1/2004 | Araki |
| 2004/0052076 A1 | 3/2004 | Mueller et al. |
| 2004/0150991 A1 | 8/2004 | Ouderkirk et al. |
| 2004/0223315 A1 | 11/2004 | Suehiro |
| 2005/0023545 A1 | 2/2005 | Camras et al. |
| 2005/0075234 A1 | 4/2005 | Wolff et al. |
| 2005/0127833 A1 | 6/2005 | Tieszen |
| 2005/0185416 A1 | 8/2005 | Lee et al. |
| 2005/0243570 A1 | 11/2005 | Chaves et al. |
| 2005/0269582 A1 | 12/2005 | Mueller et al. |
| 2006/0152140 A1 | 7/2006 | Brandes |
| 2006/0152931 A1 | 7/2006 | Holman |
| 2006/0255353 A1 | 11/2006 | Taskar et al. |
| 2007/0018102 A1 | 1/2007 | Braune et al. |
| 2007/0256453 A1 | 11/2007 | Barnes et al. |
| 2007/0257267 A1 | 11/2007 | Leatherdale et al. |
| 2007/0273282 A1 | 11/2007 | Radkov et al. |
| 2008/0054280 A1 | 3/2008 | Reginelli et al. |
| 2008/0079910 A1 | 4/2008 | Rutherford et al. |
| 2008/0080166 A1 | 4/2008 | Duong et al. |
| 2008/0101754 A1 | 5/2008 | Parker et al. |
| 2008/0112183 A1 | 5/2008 | Negley |
| 2008/0297027 A1 | 12/2008 | Miller et al. |
| 2009/0200939 A1 | 8/2009 | Lenk et al. |
| 2009/0201677 A1 | 8/2009 | Hoelen et al. |
| 2009/0272996 A1 | 11/2009 | Chakraborty |
| 2009/0310352 A1 | 12/2009 | Chang |
| 2010/0020262 A1 | 1/2010 | Hong |
| 2010/0066236 A1 | 3/2010 | Xu et al. |
| 2010/0073927 A1 | 3/2010 | Lewin et al. |
| 2010/0097821 A1 | 4/2010 | Huang et al. |
| 2010/0123386 A1 | 5/2010 | Chen |
| 2010/0134016 A1 | 6/2010 | York et al. |
| 2010/0148151 A1 | 6/2010 | Camras et al. |
| 2010/0172120 A1 | 7/2010 | Wegh et al. |
| 2010/0232134 A1 | 9/2010 | Tran |
| 2010/0263723 A1 | 10/2010 | Allen et al. |
| 2010/0264432 A1 | 10/2010 | Liu et al. |
| 2010/0290226 A1 | 11/2010 | Harbers et al. |
| 2010/0301367 A1 | 12/2010 | Nakamura et al. |
| 2010/0301727 A1 | 12/2010 | Lenk |
| 2010/0308354 A1 | 12/2010 | David et al. |
| 2010/0308356 A1 | 12/2010 | Wirth |
| 2011/0080108 A1 | 4/2011 | Chiang et al. |
| 2011/0089817 A1 | 4/2011 | Lyons et al. |
| 2011/0176091 A1 | 7/2011 | Boonekamp et al. |
| 2011/0182065 A1 | 7/2011 | Negley et al. |
| 2011/0227037 A1 | 9/2011 | Su |
| 2011/0267800 A1 | 11/2011 | Tong et al. |
| 2011/0267801 A1 | 11/2011 | Tong et al. |
| 2011/0273882 A1 | 11/2011 | Pickard |
| 2011/0291130 A1 | 12/2011 | Diana et al. |
| 2011/0298371 A1 | 12/2011 | Brandes et al. |
| 2012/0033403 A1 | 2/2012 | Lamvik et al. |
| 2012/0039073 A1 | 2/2012 | Tong |
| 2012/0068205 A1 | 3/2012 | Galvez et al. |
| 2012/0112661 A1 | 5/2012 | Van de Ven et al. |
| 2012/0119221 A1 | 5/2012 | Negley |
| 2012/0127694 A1 | 5/2012 | Richardson |
| 2012/0140436 A1 | 6/2012 | Yang et al. |
| 2012/0147296 A1 | 6/2012 | Montgomery et al. |
| 2012/0181565 A1 | 7/2012 | David et al. |
| 2012/0187441 A1 | 7/2012 | Li |
| 2012/0195063 A1 | 8/2012 | Kim |
| 2012/0287602 A1 | 11/2012 | Urano |
| 2012/0327656 A1 | 12/2012 | Ramer et al. |
| 2013/0021776 A1 | 1/2013 | Veerasamy et al. |
| 2013/0201715 A1 | 8/2013 | Dau et al. |
| 2014/0160724 A1 | 6/2014 | Lerman |
| 2015/0003059 A1 | 1/2015 | Haitz et al. |
| 2015/0241029 A1 | 8/2015 | York |

FOREIGN PATENT DOCUMENTS

| | | |
|---|---|---|
| CN | 101675288 | 3/2010 |
| EP | 2293354 | 3/2011 |
| JP | 2007158009 | 6/2007 |
| WO | WO01/07828 | 2/2001 |
| WO | WO 01/27962 | 4/2001 |
| WO | WO03/017729 | 2/2003 |
| WO | WO04/076916 | 9/2004 |
| WO | WO2007081812 | 7/2007 |

(56) References Cited

FOREIGN PATENT DOCUMENTS

| WO | PCT/IB2011/052874 | 6/2011 |
|---|---|---|
| WO | WO 2013/078463 | 5/2013 |

OTHER PUBLICATIONS

Allen, et al. "ELiXIR—Solid-State Luminaire With Enhanced Light Extraction by Internal Reflection", Journal of Display Technology, vol. 3, No. 2, Jun. 2007 pp. 155-159.
Allen, et al., "Highly Efficient light-emitting composite material for solid-state illumination devices, lasers, and luminescent collectors", U.S. Appl. No. 60/961,185, filed Jul. 19, 2007, 38 pages.
Carclo Technical Plastics "LUXEON® I 20 & 26.5mm Range", downloaded from the internet at: http://docs-europe.electrocomponents.com/webdocs/0dcb/0900766b80dcbbeb.pdf on Oct. 30, 2012, 31 pages.
Intematix, "Design Considerations for ChromaLit™ Ellipse, Candle, and Dome Remote Phosphor Light Sources", Jan. 11, 2012, downloaded from the internet at: http://www.intematix.com/uploads/files/imx-design-considerations-ecd-app-note.pdf , on Oct. 30, 2012, 23 pages.
Intematix, "Mixing Chamber Design Considerations for ChromaLit™ Remote Phosphor Light Sources", Aug. 29, 2012, downloaded from the internet at: http://www.intematix.com/uploads/files/intematix_mixing_chamber_design_for_chromalit.pdf on Oct. 30, 2012, 12 pages.
International Bureau of WIPO, International Preliminary Report on Patentability, PCT/US2008/070621, dated Jan. 19, 2010, 6 pages.
International Searching Authority, The International Search Report and Written Opinion of the International Searching Authority, PCT/US2008/070621, dated Sep. 26, 2008, 9 pages.
International Searching Authority, The International Search Report and Written Opinion of the International Searching Authority, PCT/US2012/66463, dated Apr. 2, 2013, 18 pages.
Liu, et al. "Effects of Phosphor's Location on LED Packaging Performance", 2008 International Conference on Electronic Packaging Technology & High Density Packaging (ICEPT-HDP 2008), 7 pages.
Liu, et al. "Effects of Phosphor's Thickness and Concentration on Performance of White LEDs", 2008 International Conference on Electronic Packaging Technology & High Density Packaging (ICEPT-HDP 2008), 6 pages.
Mims III, Forrest, "Sun Photometer with Light-Emitting Diodes as Spectrally Selective Detectors", Applied Optics 31, 6965-6967, 1992.
Carr et al., "One-Watt GaAs p-n Junction Infrared Source", Applied Physics Letters, vol. 3, No. 10, Nov. 15, 1963, pp. 173-175.
W. N. Carr, "Photometric Figures of Merit for Semiconductor Luminescent Sources Operating in Spontaneous Mode", Infrared Physics, 1966, vol. 6, pp. 1-19.
Authorized Officer Blaine R. Copenheaver, Notification of Transmittal of the International Search Report and Written Opinion, International Application No. PCT/US2013/059511, dated Feb. 14, 2014, 7 pages.
Authorized Officer Blaine R. Copenheaver, Notification of Transmittal of the International Search Report and Written Opinion, International Application No. PCT/US2013/059545, dated Feb. 14, 2014, 15 pages.
Authorized Officer Blaine R. Copenheaver, Notification of Transmittal of the International Search Report and Written Opinion, International Application No. PCT/US2013/059544, dated Feb. 14, 2014, 9 pages.
Authorized Officer Blaine R. Copenheaver, Notification of Transmittal of the International Search Report and Written Opinion, International Application No. PCT/US2013/059525, dated Feb. 19, 2014, 9 pages.
Authorized Officer Blaine R. Copenheaver, Notification of Transmittal of the International Search Report and Written Opinion, International Application No. PCT/US2014/021778, dated Jun. 23, 2014, 11 pages.
International Application No. PCT/US2015/062749, Notification of Transmittal of the International Search Report and the Written Opinion of the International Searching Authority, dated Feb. 19, 2016, 12 pages.

* cited by examiner

LIGHT-EMITTING DEVICE WITH LIGHT GUIDE FOR TWO WAY ILLUMINATION

CROSS-REFERENCE TO RELATED APPLICATION

This application is a continuation of U.S. patent application Ser. No. 14/170,222 filed on Jan. 31, 2014, which claims the benefit under 35 U.S.C. § 119(e)(1) of U.S. Provisional Application No. 61/774,391, filed on Mar. 7, 2013, which are incorporated by reference herein.

TECHNICAL FIELD

The described technology relates to light-emitting devices including a light guide configured to produce two way illumination profiles.

BACKGROUND

The present technology relates generally to light-emitting devices and, in particular, to light-emitting devices that feature a solid state light-emitting element and a scattering element and an extractor element remote from a light-emitting element.

Light-emitting elements are ubiquitous in the modern world, being used in applications ranging from general illumination (e.g., light bulbs) to lighting electronic information displays (e.g., backlights and front-lights for LCDs) to medical devices and therapeutics. Solid state light emitting devices, which include light emitting diodes (LEDs), are increasingly being adopted in a variety of fields, promising low power consumption, high luminous efficacy and longevity, particularly in comparison to incandescent and other conventional light sources.

One example of a SSL device increasingly being used for in luminaires is a so-called "white LED." Conventional white LEDs typically include an LED that emits blue or ultraviolet light and a phosphor or other luminescent material. The device generates white light via down-conversion of blue or UV light from the LED (referred to as "pump light") by the phosphor. Such devices are also referred to as phosphor-based LEDs (PLEDs). Although subject to losses due to light-conversion, various aspects of PLEDs promise reduced complexity, better cost efficiency and durability of PLED-based luminaires in comparison to other types of luminaires.

While new types of phosphors are being actively investigated and developed, configuration of PLED-based light-emitting devices, however, provides further challenges due to the properties of available luminescent materials. Challenges include light-energy losses from photon conversion, phosphor self-heating from Stokes loss, dependence of photon conversion properties on operating temperature, degradation due to permanent changes of the chemical and physical composition of phosphors in effect of overheating or other damage, dependence of the conversion properties on intensity of light, propagation of light in undesired directions in effect of the random emission of converted light that is emitted from the phosphor, undesired chemical properties of phosphors, and controlled deposition of phosphors in light-emitting devices, for example.

SUMMARY

The present technology relates generally to light-emitting devices and, in particular, to light-emitting devices that feature a solid state light-emitting element and a scattering element and an extractor element remote from a light-emitting element. The light-emitting devices can be configured to provide two-way illumination.

In one aspect, a light-emitting device includes a base substrate having a base surface; one or more light-emitting elements (LEEs) configured to emit light, where the LEEs are disposed on the base surface; a first optical element having a first surface spaced apart from the LEEs and positioned to receive light from the LEEs, where the first optical element includes scattering centers arranged to scatter light from the LEEs; a second optical element having an exit surface, where the second optical element is transparent and in contact with the first optical element, there being an optical interface between the first and second optical elements at the place of contact, where the optical interface is opposite the first surface of the first optical element, and the second optical element is arranged to receive light from the first optical element through the optical interface; where a medium adjacent to the first surface of the first optical element has a refractive index $n_0$; the first optical element includes a first material having a first refractive index $n_1$, where $n_0 < n_1$; the second optical element includes a second material having a refractive index $n_2$, where $n_0 < n_2$; the exit surface is shaped such that an angle of incidence on the exit surface of the light provided by the first optical element that directly impinges on the exit surface is less than a critical angle for total internal reflection; and a reflector element adjacent the second optical element, where the reflector element has first and second surfaces extending away from the exit surface, and the reflector element is arranged to reflect a first portion of light from the second optical element.

The foregoing and other embodiments can each optionally include one or more of the following features, alone or in combination. In some embodiments the first surface can be reflective and face the LEEs, where the first surface can be arranged to reflect the first portion of light. In some embodiments, the second surface can be reflective and opposite the first surface, where the second surface can be arranged to reflect a second portion of light from the second optical element. In some embodiments, the second surface can be opposite the first surface and configured to absorb a second portion of light from the second optical element. In some embodiments, the light-emitting device can further include a heat sink coupled to the base substrate, where the heat sink can be configured to remove heat from the light-emitting element. In another aspect, a light-emitting device includes a base substrate having a base surface;

one or more light-emitting elements (LEEs) configured to emit light, where the LEEs are disposed on the base surface; a first optical element having a first surface spaced apart from the LEEs and positioned to receive light from the LEEs, where the first optical element includes scattering centers arranged to scatter light from the LEEs; a second optical element having an exit surface, where the second optical element is transparent and in contact with the first optical element, there being an optical interface between the first and second optical elements at the place of contact, where the optical interface is opposite the first surface of the first optical element, and the second optical element is arranged to receive light from the first optical element through the optical interface; where a medium adjacent to the first surface of the first optical element has a refractive index $n_0$; the first optical element includes a first material having a first refractive index $n_1$, where $n_0 < n_1$; the second optical element includes a second material having a refractive index $n_2$, where $n_0 < n_2$; the exit surface is shaped such that an angle of incidence on the exit surface of the light provided by the first optical element that directly impinges on the exit surface is less than a critical angle for total internal reflection; and a light guide adjacent to the second optical element, where the light guide has a reflective first surface on one side of the light guide facing the LEEs and arranged to reflect a first portion of light from the second optical element.

The foregoing and other embodiments can each optionally include one or more of the following features, alone or in combination. In some embodiments a second surface of the one side of the light guide can be configured to reflect a second portion of light from the second optical element, where the second surface can be opposing the first surface.

DETAILED DESCRIPTION

When using light-emitting devices, it may be desired to provide two-way illumination, for example, it may be desired that a light-emitting device hanging from a ceiling illuminates an area below the light-emitting device and also illuminates the ceiling. Such two-way illumination can be provided, for example, by adding a reflector element (e.g., conical mirror) or a light guide extension to a light-emitting device.

Figure 1:
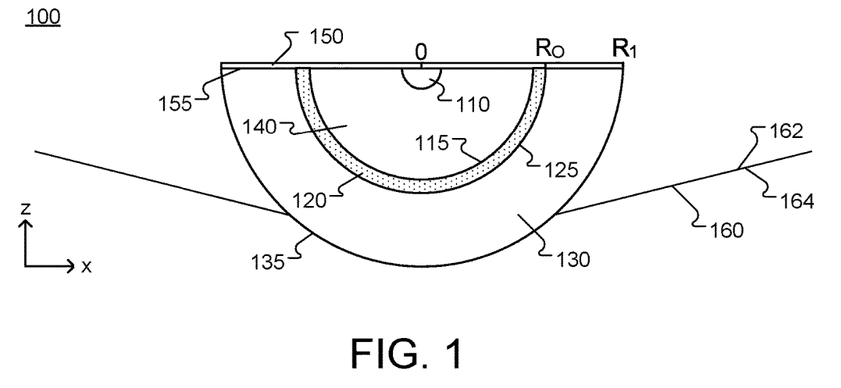
FIG. 1 shows a cross-sectional side view of an example of a light-emitting device with a reflector element.

FIG. 1 shows a cross-sectional side view of an example of a light-emitting device 100 with a reflector element 160. The light-emitting device 100 can include a base substrate 150, one or more light-emitting elements, such as light-emitting element 110 (e.g., a blue pump LED), a scattering element 120, and an extractor element 130. The base substrate 150 has a surface 155, which can be diffuse and/or specular reflective (e.g., a mirror). The scattering element 120 has a first surface 115 spaced apart from the light-emitting element 110 and positioned to receive the light from the light-emitting element 110. The light-emitting element 110 can be disposed on the surface 155 of the base substrate 150, in an opening that is, at least in part, defined by the first surface 115. The scattering element 120 includes scattering centers configured to elastically and/or inelastically scatter light. As such the scattering element may or may not alter the spectral composition of light passing through it.

In some implementations, the surface 155 extends to at least the first surface 115 of the scattering element 120. In some implementations, the surface 155 extends to at least an exit surface 135 of the extractor element 130. The scattering element 120 can be located on the inside of the extractor element 130 adjacent an enclosure 140 (e.g., a semispherical enclosure of radius $R_O$) of the extractor element 130 to form an optical interface 125. The enclosure 140 can be filled with a medium (e.g., gas or air) and encloses the light-emitting element 110, and at least a portion of the surface 155.

In some implementations, the exit surface 135 of the extractor element 130 can have a radius $R_1$ that is concentric with the optical interface 125, such that the extractor element 130 satisfies the Brewster configuration $R_1 \geq R_{1B}$. The Brewster radius is given by $R_{1B} = B_0(1+n1^2)^{+1/2}$, where $R_O$ is the radius of the optical interface 125 of the light-emitting device 100, and n1 denotes the index of refraction of the material of the extractor element 130. As the extractor element 130 satisfies the Brewster configuration, an angle of incidence on the exit surface 135 of the scattered light that directly impinges on the exit surface 135 is less than the Brewster angle, and as such, the scattered light that directly impinges on the exit surface 135 experiences little or no total internal reflection thereon.

In this example, light propagation asymmetry arises from the materials on the inside (index n0) and outside (index n1) of the scattering element 120 with index np being unequal. For instance, if np=1.5 and n0=1.0, that is n0<np, a large fraction (~75%) of the isotropically distributed photons impinging on the first surface 115 will be reflected by total internal reflection (TIR) back into the scattering element 120 and only a smaller fraction (~25%) will be transmitted backwards into the recovery enclosure 140 from where some may reach the light-emitting element 110. At the optical interface 125, the condition np≤n1 will guarantee that substantially all photons reaching the optical interface 125 will transition into the extractor element 130, and the Brewster condition will further guarantee that practically all these photons will transmit into air without TIR through the exit surface 135. Only a small fraction (down to about ~4% depending on incidence angle) will be returned by Fresnel reflection at the exit surface 135.

In some implementations, the reflector element 160 can be coupled with the extractor element and configured (e.g., as a conical mirror) to redirect some of the light output through the exit surface 135 of the extractor element 130. The reflector element 160 has a reflective surface 162 (e.g., diffuse and/or specular reflective) that faces the light-emitting element 110 and is arranged to redirect a portion of the light output through the exit surface 135. A surface 164 of the reflector element 160 is opposite the reflective surface 162. In some implementations, the surface 164 can be reflective (e.g., a layer of aluminum, silver, or a coat of white paint) to redirect a portion of the light that is output through the exit surface 135. In other implementations, the surface 164 can be absorbent (e.g., a black layer or coat of black paint) to absorb a portion of the light that is output through the exit surface 135.

Figure 2:
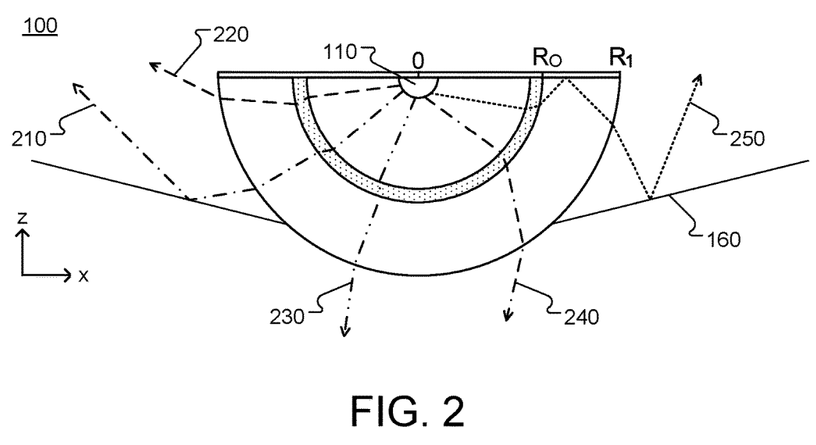
FIG. 2 shows examples of rays of light output by a light-emitting device.

FIG. 2 shows example rays 210, 220, 230, 240, and 250 of light output by the light-emitting device 100. At least some of the light output from the exit surface of the extractor element can be reflected by the reflector element 160. For example, ray 210 shows light emitted by the light-emitting element 110 that passes through the scattering element and the extractor element, and is reflected by reflector element 160 in an upward direction (having a component parallel to the z-axis). Ray 220 shows light emitted by the light-emitting element 110 that passes through the scattering element and the extractor element, and is output through the exit surface of the extractor element in an upward direction (having a component parallel to the z-axis) without reflection off the reflector element 160. Rays 230 and 240 show light emitted by the light-emitting element 110 that passes through the scattering element and the extractor element below the reflector element 160 (having a component anti-parallel to the z-axis). Ray 250 shows light emitted by the light-emitting element 110 that passes through the scattering element, is reflected by the surface of the base substrate within the extractor element, output through the exit surface of the extractor element towards the reflector element 160, and reflected by the reflector element 160 in an upward direction (having a component parallel to the z-axis).

Figure 3A:
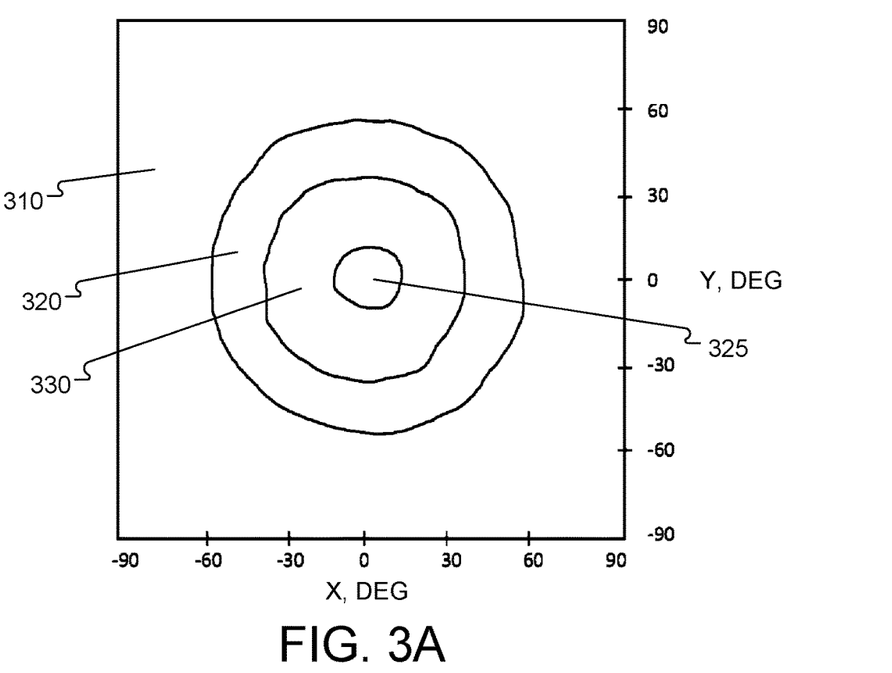
FIG. 3A shows an example distribution of radiant light intensity of a light-emitting device in an upward direction.
Figure 3B:
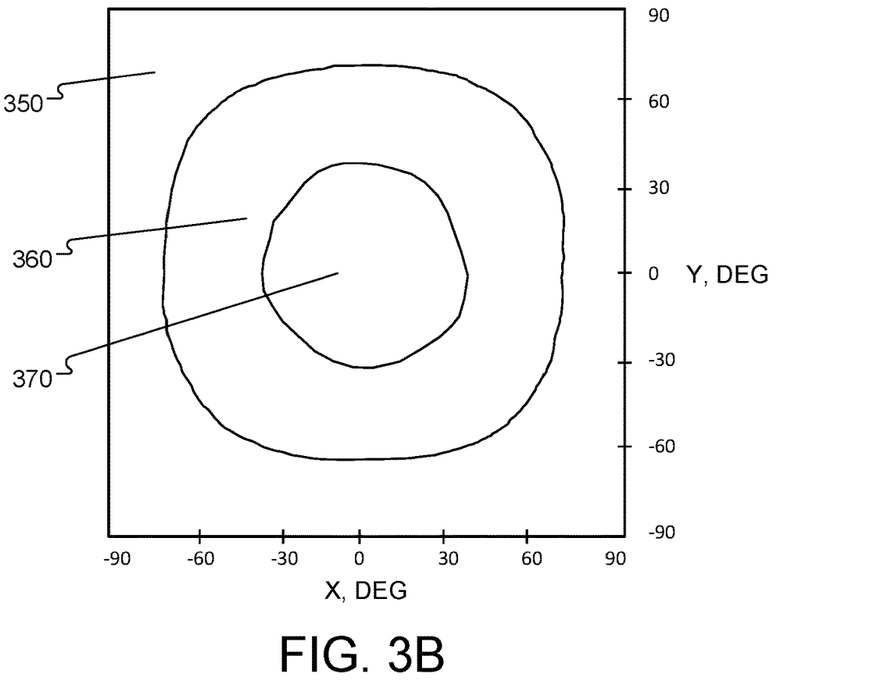
FIG. 3B shows an example distribution of radiant light intensity of a light-emitting device in a downward direction.

FIG. 3A shows radiant light intensity of the light-emitting device 100 in an upward direction (e.g., in the +z direction of FIGS. 1-2). FIG. 3B shows radiant light intensity of the light-emitting device 100 in a downward direction (e.g., in the −z direction of FIGS. 1-2). The areas 310, 320, 325, 330, 350, 360, and 370 shown in FIGS. 3A and 3B indicate different levels of radiant intensity of the light-emitting device 100 in a horizontal plane above the light-emitting device 100 (FIG. 3A) and below the light-emitting device 100 (FIG. 3B). For example, in the upward direction, the radiant light intensity is lowest in the area 310 and gradually increases through area 320 to the highest upward radiant light intensity in area 330. In the downward direction, the radiant light intensity is lowest in area 350 and gradually increases through area 360 to the highest downward radiant light intensity in area 370.

Dependent on the configuration of the light-emitting device 100, the radiant light intensity can decrease above the optical center of the light-emitting device as shown in area 325 of FIG. 3A. This decrease in radiant light intensity can be caused, for example by the shape (e.g., doughnut shape) and relative narrowness of the reflector element 160 of the light-emitting device 100. The upward light radiation pattern can be modified by adjusting the angle and position of the reflector element 160.

Figure 4:
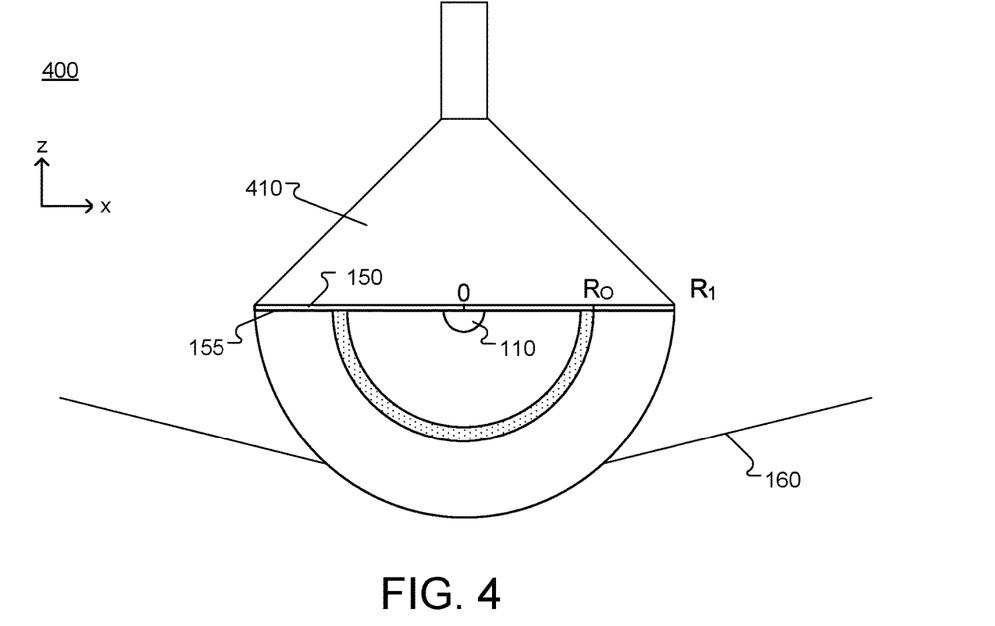
FIG. 4 shows an example of a light-emitting device with a heat sink.

In some implementations, a heat sink can be added to the light-emitting element 100. FIG. 4 shows an example of a light-emitting device 400 with a heat sink 410. Light-emitting elements, such as light-emitting element 110, can produce heat and it may be desired to remove the heat from the light-emitting elements, for example to increase the lifecycle of the light-emitting elements. The heat sink 410 can be directly or indirectly coupled to the light-emitting elements. For example, to remove excess heat from the light-emitting element 110, a heat sink 410 can be coupled to the base substrate 150 of the light-emitting device 400. In some implementations, the base substrate 150 can be thermally conductive and transfer heat from the light-emitting element 110 to the heat sink 410. In some implementations, the heat sink can cover the entire base substrate or a portion thereof.

Figure 5:
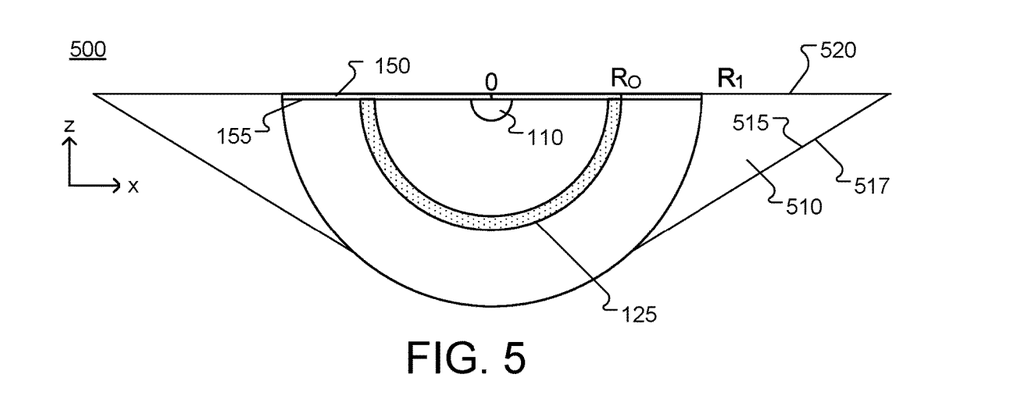
FIG. 5 shows an example of a light-emitting device with a radial light guide.

FIG. 5 shows a light-emitting device 500 with a radial light guide 510 to redirect light. The light emitting device 500 can include a base substrate 150, one or more light-emitting elements, such as light-emitting element 110 (e.g., a blue pump LED), a scattering element, and an extractor element. The base substrate 150 can have a surface 155. In some implementations, the surface 155 can be reflective (e.g., a mirror). The radial light guide 510 can be coupled to the extractor element of the light-emitting device 500. In some implementations, the radial light guide 510 can include a reflective surface 515 (e.g., a total internal reflection (TIR) mirror or a reflective coat) to redirect a portion of the light output through the exit surface 135 of the extractor element 130, for example, in an upward direction (e.g., in the +z direction). The radial light guide 510 can also include an exit surface 520 through which the light that is received by the radial light guide 510 (e.g., through the extractor element) is output.

In some implementations, a layer 517 (e.g., coating) can be coupled with the reflective surface 515. In some implementations, the layer 517 can be reflective (e.g., aluminum, silver, or a coat of white paint) to redirect (e.g., in the −z direction) a portion of the light that is output through the exit surface 135. In other implementations, the layer 517 can be absorbent (e.g., a coat of black paint) to absorb a portion of the light that is output through the exit surface 135. In other implementations (not shown), for example when the light guide is a solid material (e.g., glass), a reflective layer (e.g., aluminum, silver, or white coating) can be coupled with the surface 515 and an absorbent layer (e.g., black coating) can be coupled with the reflective layer.

Figure 6:
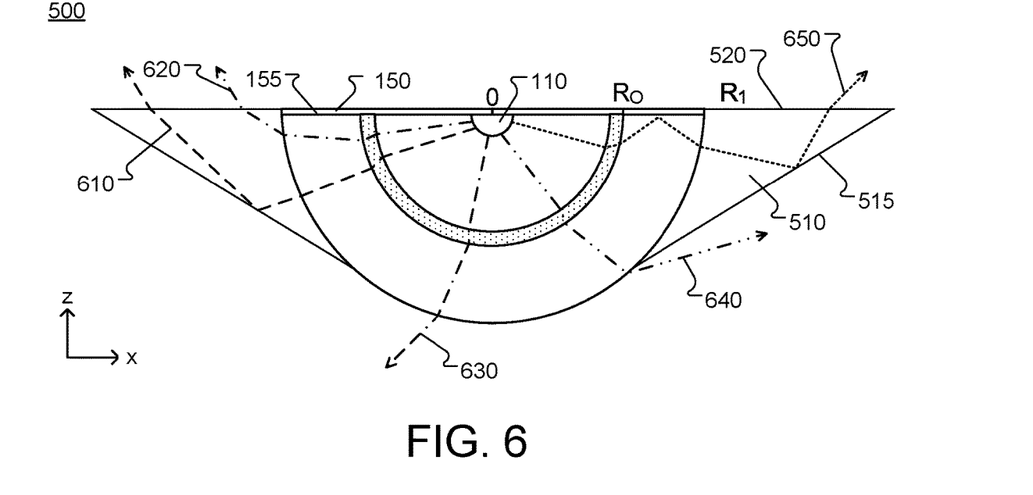
FIG. 6 shows an example of rays of light output by a light-emitting device.

FIG. 6 shows example rays 610, 620, 630, 640, and 650 of light output by the light-emitting device 500. At least some of the light emitted by the light-emitting element 110 can be reflected by the reflective surface 515 of the radial light guide 510. For example, ray 610 shows light emitted by the light-emitting element 110 that passes through the scattering element and extractor of the light-emitting device 500, and is reflected by the reflective surface 515 of the radial light guide 510 and output in an upward direction (e.g., in the +z direction) through the exit surface 520. Dependent on the embodiment, the substrate 150 may extend only across around the vicinity of the light-emitting element 110 without protruding beyond (not illustrated in FIG. 6) the optical interface 125. Ray 620 shows light emitted by the light-emitting element 110 that passes through the scattering element and extractor of the light-emitting device 500, and is output in an upward direction (e.g., in the +z direction) through the exit surface 520 of the radial light guide 510 without reflection off the reflective surface 515. Rays 630 and 640 show light that passes, through the scattering element and extractor of the light-emitting device 500, below the radial light guide 510. Ray 650 shows light that passes through the scattering element, is reflected by the surface 155 of the base substrate 150 within the extractor element towards the reflective surface 515 of the radial light guide 510, reflected by the reflective surface 515, and output through the exit surface 520 in an upward direction (e.g., in the +z direction).

Figure 7A:
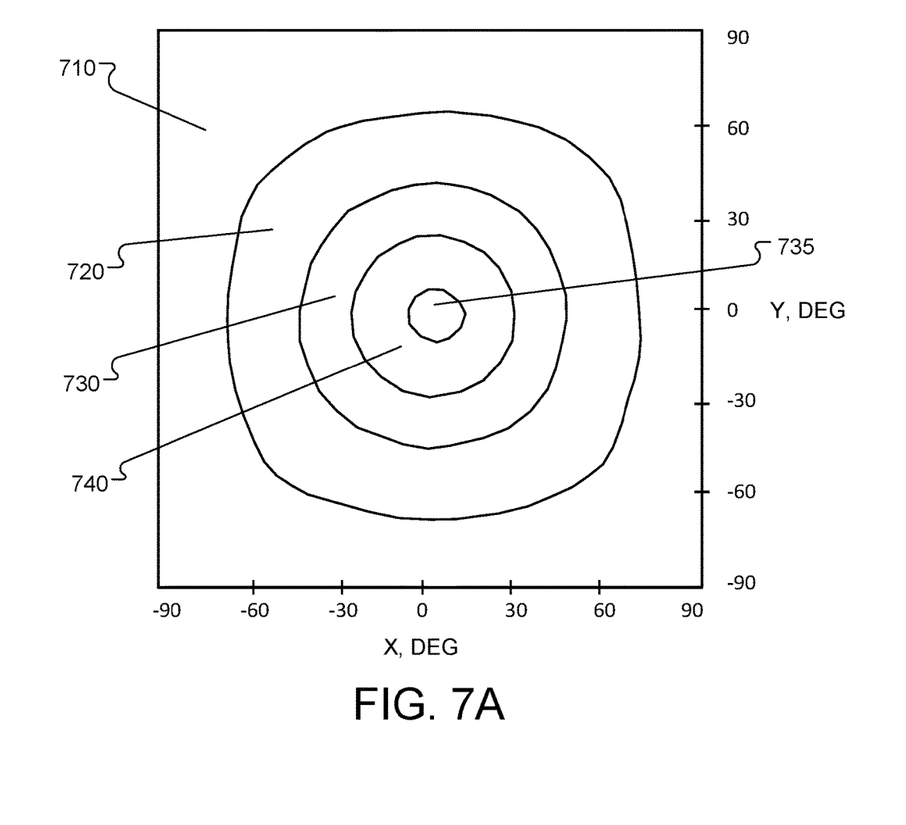
FIG. 7A shows an example distribution of radiant light-intensity of a light emitting device in an upward direction.
Figure 7B:
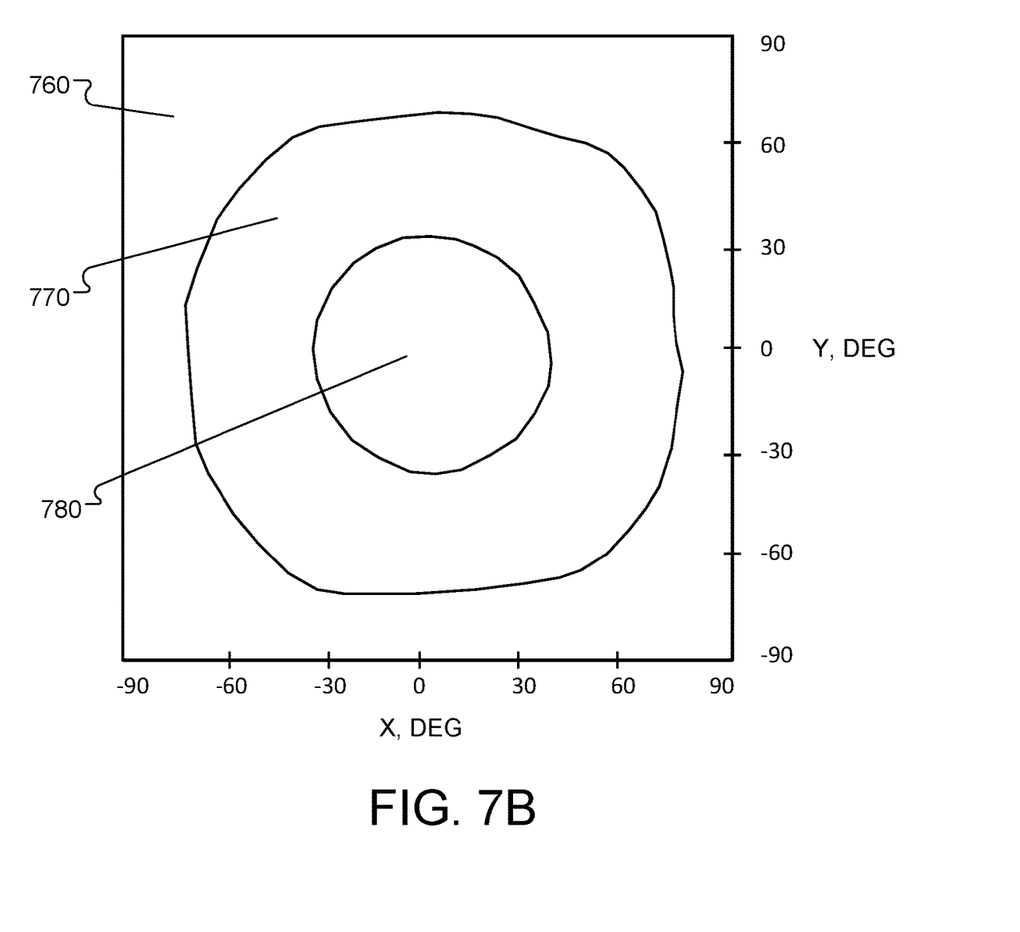
FIG. 7B shows an example distribution of radiant light-intensity of a light-emitting device in a downward direction.

FIG. 7A shows radiant light intensity of the light emitting device 500 in an upward direction (e.g., in the +z direction of FIGS. 5-6). FIG. 3B shows radiant light-intensity of the light-emitting device 500 in a downward direction (e.g., in the −z direction of FIGS. 5-6). The areas 710, 720, 730, 735, 740, 760, 770, and 780 shown in FIGS. 7A and 7B indicate different levels of radiant intensity of the light-emitting device 500 in a horizontal plane above the light-emitting device 500 (FIG. 7A) and below the light-emitting device (FIG. 7B). For example, in the upward direction, the radiant light intensity is lowest in the area 710 and gradually increases through areas 720 and 730 to the highest upward radiant light intensity in area 740. In the downward direction, the radiant light intensity is lowest in area 760 and gradually increases through area 770 to the highest downward radiant light intensity in area 780.

Dependent on the configuration of the light-emitting device 500, the radiant light intensity can decrease above the optical center of the light-emitting device as shown in area 735 of FIG. 7A. The decrease in radiant light intensity can be caused, for example, by the shape of the radial light guide. The upward light radiation pattern can be modified by adjusting the angle and position of reflective surface and exit surface of the radial light guide.

Figure 8:
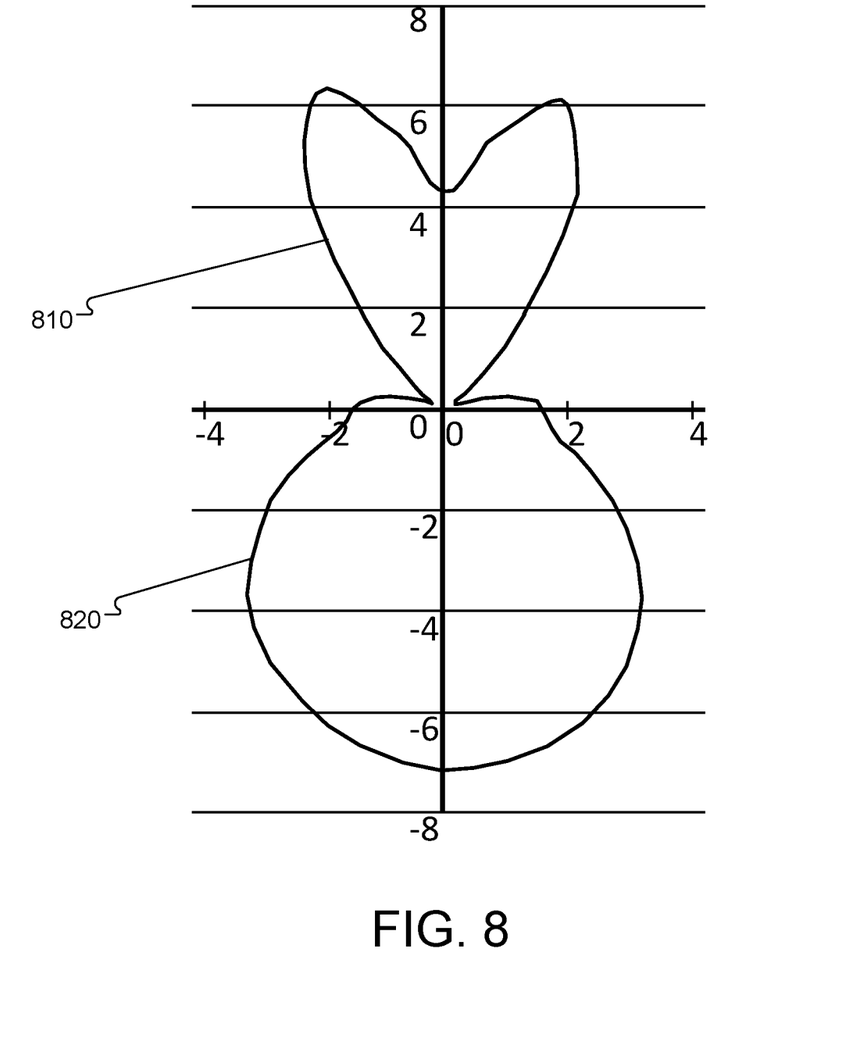
FIG. 8 shows an example of a polar plot of a radiation pattern for a light-emitting device.

FIG. 8 shows a polar plot of the radiation pattern for the light-emitting device 500. Lobes 810 of the radiation pattern correspond to the upward light radiation and lobe 820 of the radiation pattern corresponds to the downward light radiation of the light-emitting device 500. The radiation pattern in the upward and/or downward direction can be modified by adjusting the radial light guide 510. For example, the angle and position of the reflective and exit surface of the radial light guide 510 can impact the radiation pattern of the light-emitting device 500. Also, the material properties (e.g., refractive index, composition, etc.) of the radial light guide 510 can affect the radiation pattern of the light-emitting device 500.

The invention claimed is:

1. A light-emitting device, comprising:
a base substrate having a base surface;
one or more light-emitting elements (LEEs) configured to emit light, the LEEs being disposed on the base surface;
a scattering element having a first surface spaced apart from the LEEs and positioned to receive light from the LEEs, the scattering element comprising scattering centers arranged to scatter light from the LEEs;
an extractor element having an exit surface, the extractor element being transparent and in contact with the scattering element, there being an optical interface between the scattering element and the extractor element at the place of contact, the optical interface being opposite the first surface of the scattering element, the extractor element being arranged to receive light from the scattering element through the optical interface, wherein
a medium adjacent to the first surface of the scattering element has a refractive index $n_0$, and
the scattering element has a first refractive index $n_1$, where $n_0 < n_1$; and
a reflector element adjacent the extractor element, the reflector element having first and second surfaces extending away from the exit surface, the reflector element being arranged to reflect a first portion of light from the extractor element.

2. The light-emitting device of claim 1, wherein the exit surface of the extractor element is shaped such that an angle of incidence on the exit surface of the light provided by the scattering element that directly impinges on the exit surface is less than a critical angle for total internal reflection.

3. The light-emitting device of claim 1, wherein the exit surface of the extractor element is concentric with the optical interface and has a radius $R_1$ which satisfies the Brewster condition, $$R_1 \geq \frac{R_0}{\sqrt{1+n_1^2}},$$

where $R_0$ is a radius of the optical interface.

4. The light-emitting device of claim 1, wherein the extractor element has a refractive index $n_2$, where $n_0 < n_2$.

5. The light-emitting device of claim 1, wherein the base surface of the base substrate is reflective.

6. The light-emitting device of claim 1, wherein the first surface of the reflector element is reflective and facing the LEEs, the first surface of the reflector element being arranged to reflect the first portion of light.

7. The light-emitting device of claim 6, wherein the second surface of the reflector element is reflective and opposite the first surface of the reflector element, the second surface of the reflector element being arranged to reflect a second portion of light from the extractor element.

8. The light-emitting device of claim 6, wherein the second surface of the reflector element is opposite the first surface of the reflector element and configured to absorb a second portion of light from the extractor element.

9. The light-emitting device of claim 1, further comprising a heat sink coupled to the base substrate, the heat sink being configured to remove heat from the light-emitting element.

* * * * *